United States Patent [19]

Wagner

[11] Patent Number: 4,589,253
[45] Date of Patent: May 20, 1986

[54] PRE-REGENERATED STAGED-COMBUSTION ROCKET ENGINE

[75] Inventor: William R. Wagner, Los Angeles, Calif.

[73] Assignee: Rockwell International Corporation, El Segundo, Calif.

[21] Appl. No.: 600,851

[22] Filed: Apr. 16, 1984

[51] Int. Cl.$^4$ ............................................. F02K 9/48
[52] U.S. Cl. ...................................... 60/204; 60/259; 60/260; 60/266; 60/736
[58] Field of Search ................ 60/204, 257, 258, 259, 60/260, 266, 736

[56] References Cited

U.S. PATENT DOCUMENTS

| 3,046,734 | 7/1962 | Abild | 60/259 X |
| 3,524,319 | 8/1970 | Stockel | 60/260 X |
| 3,561,217 | 2/1971 | Hall | 60/260 X |
| 3,577,735 | 5/1971 | Schmidt | 60/259 X |
| 3,636,712 | 1/1972 | Kaufmann | 60/260 |
| 3,828,551 | 8/1974 | Schmidt | 60/260 X |
| 4,073,138 | 2/1978 | Beichel | 60/259 X |
| 4,171,615 | 10/1979 | Stewart et al. | 60/259 X |
| 4,328,020 | 5/1982 | Hughes | 65/27 |

FOREIGN PATENT DOCUMENTS 2232685 1/1975 France .................................. 60/260

Primary Examiner—Carlton R. Croyle
Assistant Examiner—Jeffrey A. Simenauer
Attorney, Agent, or Firm—H. Fredrick Hamann; Harry B. Field; Lawrence N. Ginsberg

[57] ABSTRACT

An improvement in the design of a staged-combustion-cycle rocket engine. The preburner 16 (or preburners) is operated at a higher temperature than that above which turbine blades will be damaged. A heat-exchanger unit 40 through which the output flow of the cooling jacket 18 of the engine is passed is placed inside the preburners 16, or in close proximity to its output flow, so that heat energy is transferred from the output flow of the preburners 16 to the output flow of the cooling jacket 18. This lowers the preburners output flow to a temperature which will not damage turbine blades and raises the cooling-jacket output flow temperature. Since the output flow of the cooling jacket 18 is fed to the low-pressure turbines 22, the increased temperature raises the pressure of the low-pressure turbines 22 so that their output of flow rate is increased and the flow rate to the engine is increased, thereby increasing engine output power and efficiency.

7 Claims, 5 Drawing Figures

PRE-REGENERATIVE DESIGN

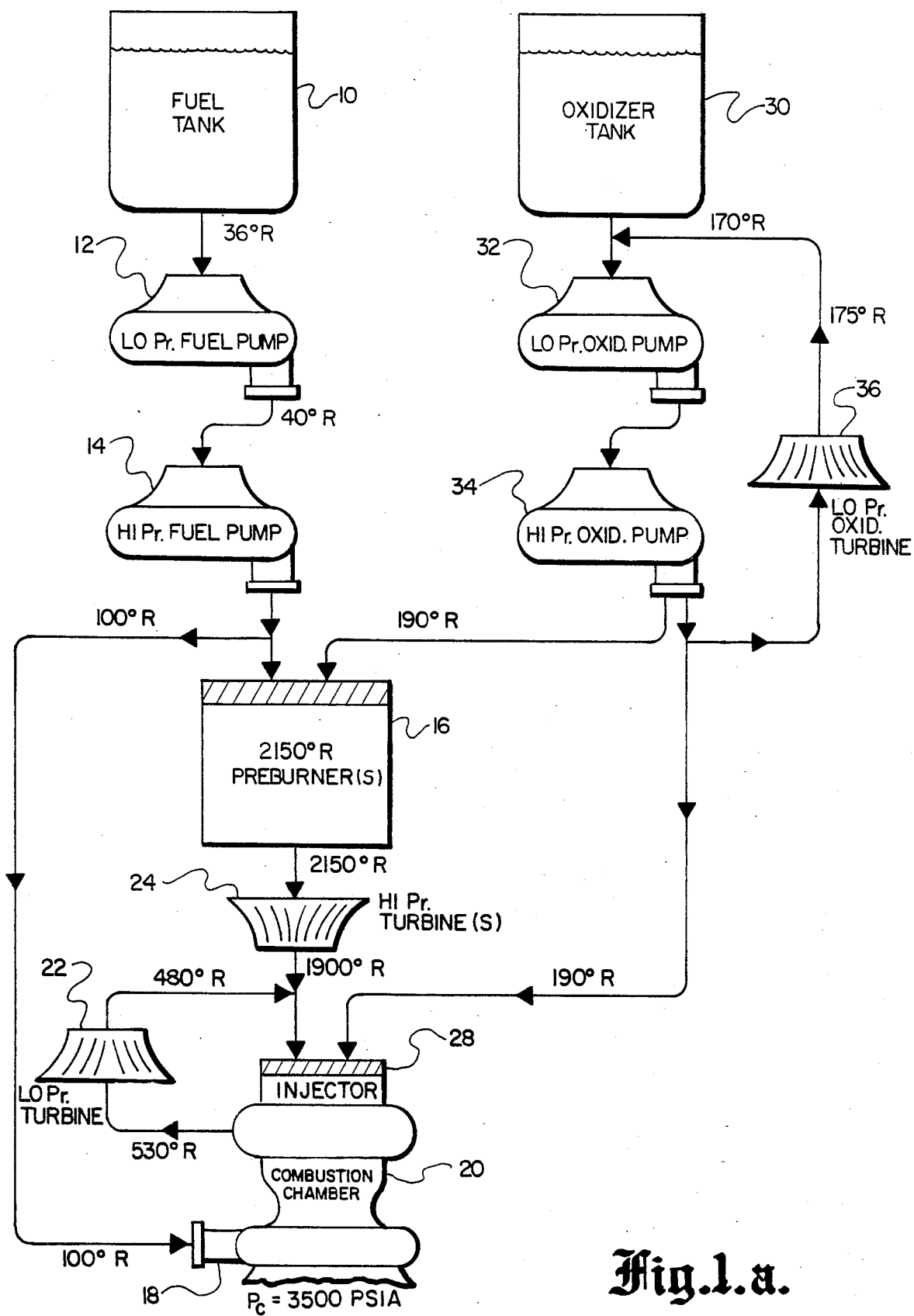
Fig. 1.a.

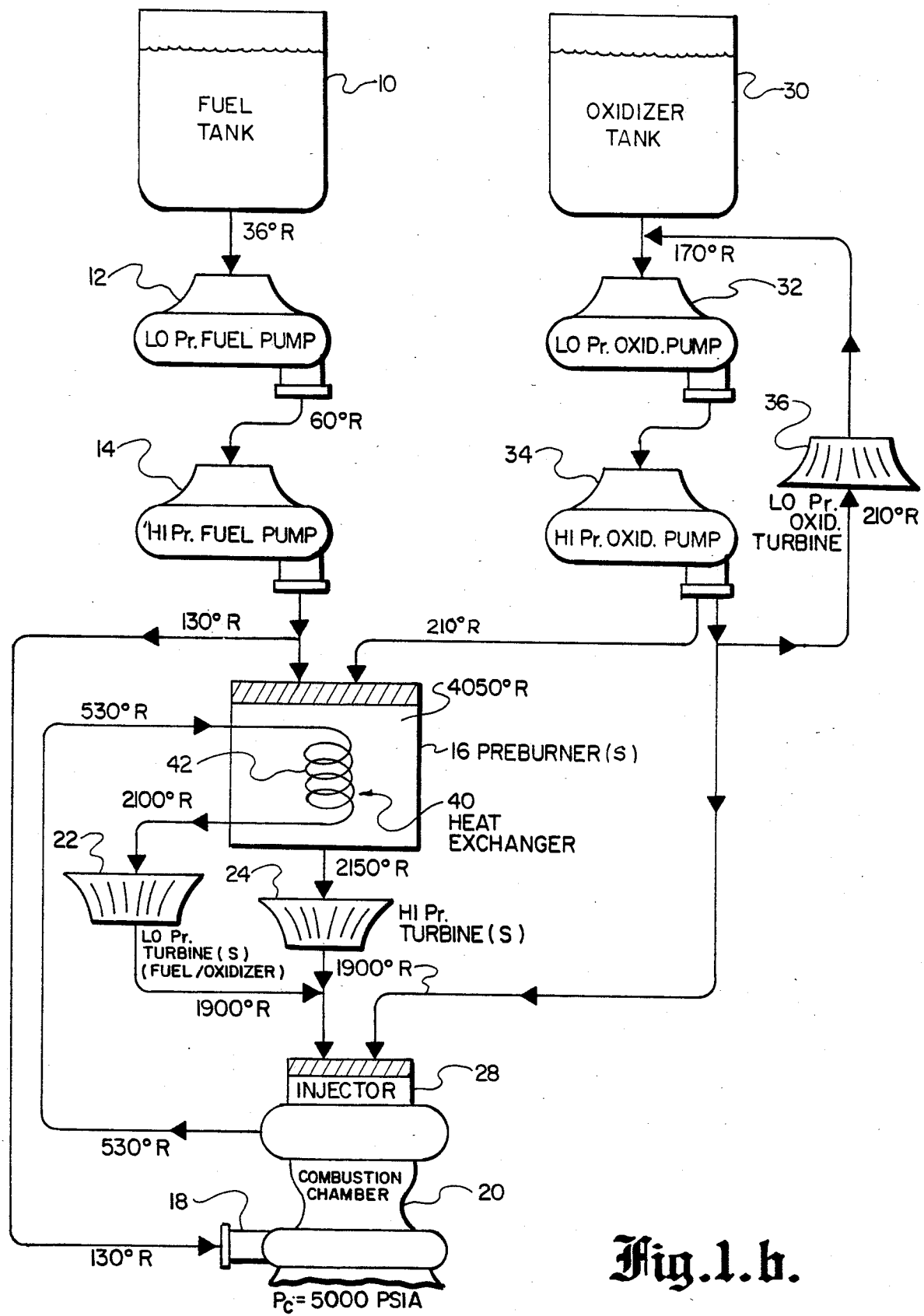
Fig.1.b.

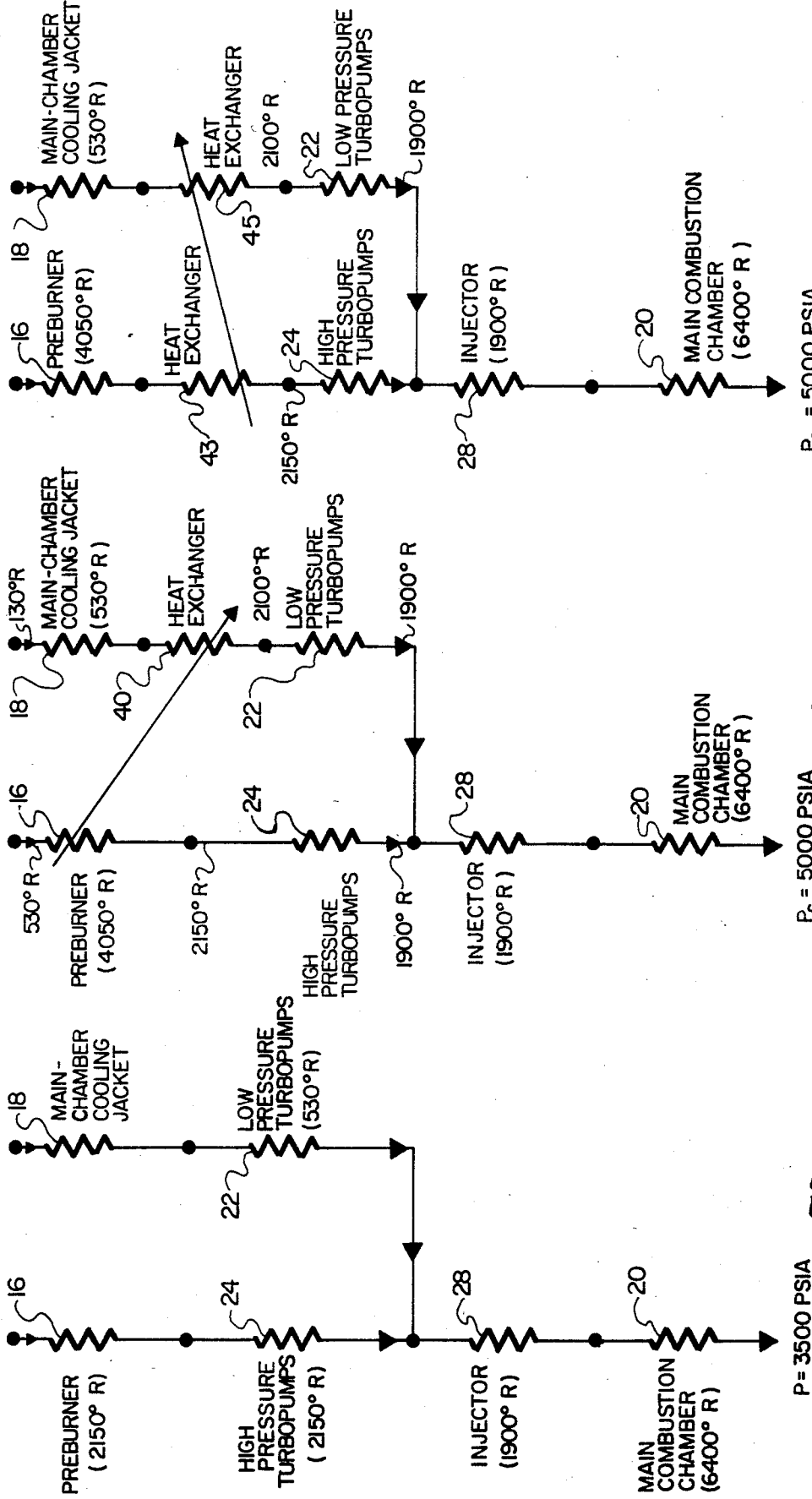

PRE-REGENERATED STAGED-COMBUSTION ROCKET ENGINE

BACKGROUND OF THE INVENTION

1. Field of the Invention

This invention relates to staged-combustion rocket engines and espcially to a pre-regenerated, staged-combustion rocket engine utilizing a heat exchanger to raise the temperature of the fluid operating the low-pressure turbines.

2. Description of the Prior Art

Staged-combustion rocket cycles wherein all propellants are burned at high pressure become pressure-limited for non-cooled turbine designs because of a limited fuel flow available for turbine drive. In current staged-combustion designs, such as the space shuttle main engine (SSME), the entire fuel flow, other than that used for chamber-jacket cooling, is used to drive the turbine pump power units. Any reduction of the flow of the fuel (or oxidizer) used as a coolant in the combustion-chamber cooling jacket, the coolant fuel then being sent through the low-pressure turbopumps, is generally unfeasible because the resulting higher chamber-wall temperatures and coolant temperatures result in a reduced thermal margin and thermal life characteristic of the chamber walls. Additional oxidizer flow to the preburner(s) is available in such cycles but this causes a higher turbine blade temperature with a consequent blade and turbine life limitation problem. As a result, current technology limits typical $O_2$—$H_2$ staged-combustion cycles to about 3500 psia combustion-chamber pressure.

OBJECTS OF THE INVENTION

An object of the invention is to increase the flow of fuel, or fuel and oxidizer, to the combustion chamber of a staged-combustion-cycle rocket engine.

Another object is to achieve the above object without reducing the flow of fluid in the cooling jacket of the rocket engine.

A further object is to increase the power, thrust and efficiency presently available from staged-combustion rocket engines.

Yet another object is to increase flow of fuel, or fuel and oxidizer, to the main combustion chamber without increasing the pressure drop or power of the high-pressure turbines and high-pressure pumps.

SUMMARY OF THE INVENTION

The invention comprises a staged-combustion-cycle rocket engine wherein the preburners are operated at a higher temperature (up to 4000° R.) than that used in present staged-combustion-cycle engines and the temperature of the output gases of the preburners is reduced to an acceptable turbine temperature (about 2150° R.) by transferring some of the heat energy of the preburner to the fluid flow from the cooling jacket of the engine. The energy thus obtained is used to raise the pressure levels of the fuel and oxidizer low-pressure pumps, thereby increasing the flow of fuel, or fuel and oxidizer, to the main combustion chamber of the rocket engine. The increased input of propellant to the engine results in higher generated thrust, higher power, and greater efficiency of operation.

Other objects, advantages and novel features of the present invention will become apparent from the following detailed description of the invention when considered in conjunction with the accompanying drawing.

BRIEF DESCRIPTION OF THE DRAWINGS

FIG. 1 is a schematic block diagram illustrating fluid flow through the turbines, pumps, preburners and cooling jacket of one side of the power head of an SSME-type staged-combustion engine, FIG. 1a being for the presently-used engine, and FIG. 1b being for the new, pre-regenerative design.

FIG. 2a is a schematic illustration of the fluid flow shown in FIG. 1a and indicating the temperature at various points.

FIG. 2b is a schematic illustration of the invention showing how a heat exchanger is included among the fluid-flow components and varies the fluid temperatures from those indicated in FIG. 2a.

FIG. 3 is a schematic similar to FIG. 2b but showing a heat exchanger unit which is separate from the preburner.

The same elements or parts throughout the figures of the drawing are designated by the same reference characters.

DETAILED DESCRIPTION OF THE PREFERRED EMBODIMENTS

A typical fuel and oxidizer flow system for a stage-combustion-cycle rocket engine such as the present SSME is shown in schematic form in FIG. 1a. Fuel flows from a fuel tank 10 through a low-pressure fuel pump 12 into a high-pressure fuel pump 14. The output of the high-pressure fuel pump 14 is fed to a preburner 16 (or preburners) and also through the cooling jacket 18 of the main combustion chamber 20 of the engine. After leaving the cooling jacket 18, the fuel flow is fed to a low-pressure turbine 22 whose output is combined with the output of the high-pressure turbine(s) 24, the combined output being passed through the injector 28 into the main combustion chamber 20. Oxidizer is coupled from an oxidizer tank 30 into a low-pressure oxidizer pump 32 and from there into a high-pressure oxidizer pump 34. The output of the high-pressure oxidizer pump 34 is fed to the preburners 16, to the low-pressure oxidizer turbine 36, and to the injector 28. Approximate temperatures in degrees Rankine are shown at different points along the flow paths.

The new pre-regenerative system is depicted in FIG. 1b. The system is smilar to that in FIG. 1a except that the fuel flow from the cooling jacket 18, instead of passing directly into the low-pressure turbine 22, is fed to a heat exchanger 40, which may be a coil or finned plate, in the preburner unit(s) 16. This enables the fuel flow from the cooling jacket 18 to be raised from a temperature of about 530° R. to a temperature of about 2100° R. before being fed into the low-pressure turbine(s) 22, because the preburner 16 (or preburners) is now operated at a temperature of about 4050° R. instead of the temperature of 2150° R. at which it operates in the present system. The preburners(s) 16 can now be operated at this higher temperature because the transfer of heat energy to the fuel in the coil of the heat exchanger 40 permits the fuel and oxidizer flow into the high-pressure turbine(s) 24 of high pressure turbopump(s) still to be maintained at the present-system level of about 2150° R., above which damage would result to the turbine blades.

However, the increase of temperature in the fuel fed from the heat excahnger coil 42 to the low-pressure turbine(s) 22 increases the pressure of the turbine(s) 22 thereby increasing the fuel flow through the low-pressure turbine(s) 22 into the main combustion chamber 20. This increase in fuel flow into the main combustion chamber 20 increases the chamber pressure, $P_c$, from 3500 psia to about 5000 psia, resulting in increased engine thrust and efficiency.

Simplified diagrams for the fuel flows with approximate temperatures along the circuits are presented in FIG. 2a and 2b. The diagrams are self-explanatory.

Another version of the pre-regenerative system is shown in FIG. 3. A heat exchanger which is separate from the preburners 16 can be employed. The output flow from the preburners 16 can be passed through a first component 43 of the heat exchanger and the output flow of the cooling jacket 18 can be passed through a second component 45 of the heat exchanger. The two components, the heat donor 43 and the heat donee 45, should be in close proximity and may comprise two closely wound coils or may comprise two passageways through a plate stack heat exchanger, such as that manufactured by the Rockwell International Corporation, Canoga Park, Calif. This type of heat exchanger is described in U.S. Pat. No. 4,347,896 issued Sept. 7, 1982.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A method for increasing the power and thrust output of a staged-combustion rocket engine, said engine having a preburner which receives a portion of an output flow of fuel from a fuel tank, said preburner having an output flow for providing a source of energy for a high-pressure turbine of a high-pressure turbopump the output flow of said high-pressure turbine combining with the output flow of a low-pressure turbine of a low-pressure turbopump, said low-pressure turbine receiving the output flow of the cooling jacket of an engine combustion chamber, said cooling jacket having received another portion of the flow from said fuel tank, said combined flow from said high-pressure turbine and from said low-pressure turbine providing a propellant supply for the combustion chamber of said rocket engine, comprising the steps of:

operating said preburner at a temperature, which is high enough so that damage to the blades of said high-pressure turbine would ordinarily occur; and sending said output flow of the cooling jacket through heat-exchange means prior to being received by said low-pressure turbine, said heat-exchange means in heat exchange relationship with said preburner to extract heat energy from said preburner so that the temperature of the flow being received by said low-pressure turbine is raised, thereby allowing said low-pressure turbopump to be operated at a higher pressure to provide a higher flow rate of fuel through said low-pressure turbopump, and the temperature of the output flow of the preburner is lowered to a level which is below that which will damage the blades of said high-pressure turbine.

2. A method as in claim 1, wherein:
said heat exchange means includes a heat donee element located within the preburner in order to raise the temperature of the cooling jacket output flow.

3. A method as in claim 1, wherein:
the output flow of the cooling jacket is fed through a heat donee element and the output flow of the preburner is fed to a heat donor element, the two components being in close proximity so that heat is transferred from the donor element to the donee element to raise the temperature of the flow in the donee element and lower the temperature of the flow in the donor element.

4. In a staged-combustion engine having a fuel flow path and an oxidizer flow path, said fuel flow path being split into a first flow path and a second flow path, said split occurring after the fuel leaves a fuel tank and is pumped by a low-pressure fuel pump of a low-pressure turbopump and a high-pressure fuel pump of a high-pressure turbopump, said first flow path including at least one preburner and a high-pressure turbine of a high-pressure turbopump, the output flow of said preburner for supplying the energy for said high-pressure turbine before the fuel enters an injector and is then finally combusted in a main combustion chamber, and said second flow path including a cooling jacket for the main combustion chamber and a low-pressure turbine of a low-pressure turbompump, the output flow of said cooling jacket providing the input flow for said low-pressure turbine which feeds its output to the injector, the improvement comprising:

heat-exchanging means, in heat exchange relationship with said preburner, having a donee element for accepting the output flow of the cooling jacket prior to said output flow of said cooling jacket being sent to said low-pressure turbine, said preburner providing heat energy to the output flow of the cooling jacket in said donee element, whereby, the temperature of the output flow of the preburner is lowered to a level which will not damage said high-pressure turbopump and the temperature of the output flow of the cooling jacket is raised so that the pressure at the low-pressure turbine is raised and the flow to the main combustion chamber is increased.

5. The improvement set forth in claim 4, wherein:
said donee element comprises a coil inside said preburner.

6. The improvement set forth in claim 4, wherein:
said heat-exchanging means comprises at least two coils in close proximity, a donor coil which is connected to receive the output flow of said preburner and a donee coil which is connected to receive the output flow of the cooling jacket.

7. The improvement set forth in claim 4, wherein:
said heat-exchanging means comprises at least a donor element and a donee element, said donor element being connected to receive the preburner output flow and said donee element being connected to receive the cooling jacket output flow.

* * * * *